(12) United States Patent
Dootz et al.

(10) Patent No.: US 11,413,655 B2
(45) Date of Patent: Aug. 16, 2022

(54) DIAPHRAGM CUP FOR AN ULTRASONIC TRANSDUCER, METHOD FOR MANUFACTURING A DIAPHRAGM CUP AND AN ULTRASONIC TRANSDUCER

(71) Applicant: Robert Bosch GmbH, Stuttgart (DE)

(72) Inventors: Rolf Dootz, Reutlingen (DE); Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 16/485,707

(22) PCT Filed: Feb. 8, 2018

(86) PCT No.: PCT/EP2018/053185
§ 371 (c)(1),
(2) Date: Aug. 13, 2019

(87) PCT Pub. No.: WO2018/149730
PCT Pub. Date: Aug. 23, 2018

(65) Prior Publication Data
US 2019/0388936 A1    Dec. 26, 2019

(30) Foreign Application Priority Data

Feb. 15, 2017    (DE) .......................... 102017202425.9

(51) Int. Cl.
*B06B 1/06* (2006.01)
*G01S 7/521* (2006.01)
*G10K 9/122* (2006.01)

(52) U.S. Cl.
CPC ............ *B06B 1/0666* (2013.01); *G01S 7/521* (2013.01); *G10K 9/122* (2013.01)

(58) Field of Classification Search
CPC .......... G10K 9/20; G10K 9/122; G01S 7/521; B06B 1/0666
See application file for complete search history.

(56) References Cited

U.S. PATENT DOCUMENTS

| | | | |
|---|---|---|---|
| 6,168,948 B1* | 1/2001 | Anderson | B01F 31/86 435/6.12 |
| 2002/0022261 A1* | 2/2002 | Anderson | B01L 3/5027 435/287.9 |
| 2004/0005772 A1* | 1/2004 | Choi | H05K 3/062 438/615 |

(Continued)

FOREIGN PATENT DOCUMENTS

DE    102004031310    1/2006
DE    102005045306 A1    3/2007
(Continued)

OTHER PUBLICATIONS

International Search Report for PCT/EP2018/053185, dated May 28, 2018.

*Primary Examiner* — Isam A Alsomiri
*Assistant Examiner* — Amie M Ndure
(74) *Attorney, Agent, or Firm* — Norton Rose Fulbright US LLP; Gerard Messina

(57) ABSTRACT

A diaphragm cup is described for an ultrasonic transducer, including a wall for carrying a diaphragm which is excitable to oscillations, the diaphragm cup being provided with only a single metallic coating at least in the area of the diaphragm on the outer side and the inner side.

10 Claims, 1 Drawing Sheet

(56) References Cited

U.S. PATENT DOCUMENTS

| | | | | |
|---|---|---|---|---|
| 2004/0210289 A1* | 10/2004 | Wang | .................... | A61K 9/5094 |
| | | | | 607/116 |
| 2005/0079132 A1* | 4/2005 | Wang | ...................... | A61N 2/06 |
| | | | | 424/1.11 |
| 2005/0107870 A1* | 5/2005 | Wang | .................... | B82Y 25/00 |
| | | | | 623/1.44 |
| 2006/0241474 A1* | 10/2006 | Kawashima | ............. | G10K 9/18 |
| | | | | 600/459 |
| 2008/0130416 A1* | 6/2008 | Kalbhenn | ................ | G10K 9/20 |
| | | | | 367/174 |

FOREIGN PATENT DOCUMENTS

| | | | | |
|---|---|---|---|---|
| DE | 102013213493 A1 | 1/2015 | | |
| EP | 0701281 A2 * | 3/1996 | ........... | H01L 23/538 |
| WO | 03045586 A1 | 6/2003 | | |
| WO | 2011073414 A2 | 6/2011 | | |
| WO | 2015028180 A1 | 3/2015 | | |
| WO | WO-2015028180 A1 * | 3/2015 | ............. | G01F 1/662 |

* cited by examiner

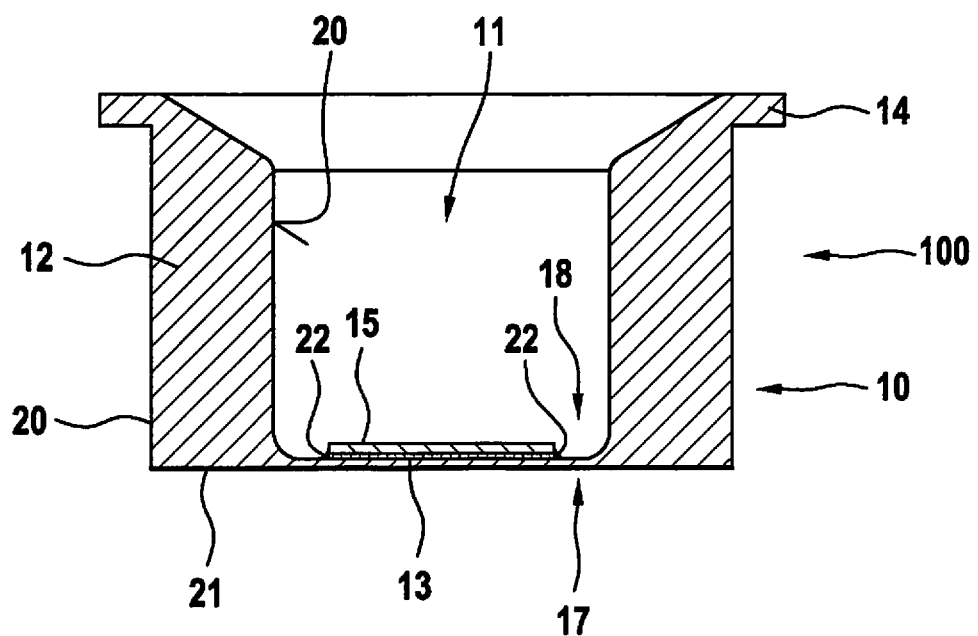

DIAPHRAGM CUP FOR AN ULTRASONIC TRANSDUCER, METHOD FOR MANUFACTURING A DIAPHRAGM CUP AND AN ULTRASONIC TRANSDUCER

FIELD OF THE INVENTION

The present invention relates to a diaphragm cup for an ultrasonic transducer, a method for manufacturing a diaphragm cup according to the present invention as well as an ultrasonic transducer which is equipped with a diaphragm cup according to the present invention.

BACKGROUND INFORMATION

It is known from German Published Patent Application No. 10 2004 031 310 of the applicant to provide a diaphragm cup, which is made of aluminum and is manufactured in particular with the aid of a deep-drawing process, at least on its outer side with a chromium coating which is either used as a finishing layer or may be, however, additionally covered by a lacquer coating. A copper layer, a high-gloss nickel layer and/or a semi-gloss nickel layer are moreover preferably situated or applied as an intermediate layer, between the material of the diaphragm cup, in the area of the outer side of the diaphragm as well as the chromium layer. The latter layers are in particular used to increase the corrosion resistance of the diaphragm cup. It is furthermore essential that the above-mentioned nickel layers have layer thicknesses between approximately 10 µm and 30 µm. Nickel layers having thicknesses of this type result in a change in the original resonance frequency of the diaphragm, which must be compensated for with the aid of corresponding constructive measures. Due to the application of different metallic layers, the manufacturing process of a diaphragm cup of this type is moreover relatively complex and expensive.

SUMMARY

The diaphragm cup for an ultrasonic transducer according to the present invention has the advantage that it is manufacturable particularly easily and cost-effectively. This is essentially achieved according to the present invention in that—in contrast to the related art—only a single metallic coat, which preferably includes nickel, is applied at least to the outer side and to the inner side of the diaphragm cup in the area of the diaphragm. A metallic layer of this type has proven to be suitable as a base for directly applying a lacquer coating which is usually provided when a visual harmonization of the outer side of the diaphragm with the vehicle color is desirable. Moreover, a metallic layer of this type (potentially preceded by a corresponding treatment of the layer) makes it possible to connect the metallic layer to a piezoelectric element, which is situated on the inner side of the diaphragm cup, via an adhesive layer. Moreover, the diaphragm cup has the advantage that the coating may be implemented particularly simply, since there are no areas on the inner side of the diaphragm cup to be covered, for example, in order to protect these areas from the metallic coating.

In one particularly preferred embodiment of the metallic coating, it is provided that same has a thickness between 0.25 µm and 0.60 µm. A thin coating of this type in particular has the advantage that the resonance frequency of the diaphragm, likewise in contrast to the related art, does not change or changes only insignificantly with regard to the original state of the diaphragm, so that corresponding measures for adapting the resonance frequency with regard to the original diaphragm may be omitted. Moreover, a thin coating of this type is also particularly resource-saving.

Moreover, the coating, preferably from nickel as already elucidated above, is in general also suitable for fastening a piezoelectric element. Since the coating is also furthermore applied on the inner side of the diaphragm cup at a relatively thin layer thickness (in particular at the same layer thickness as on the outer side of the diaphragm cup), the metallic layer or nickel layer implemented on the inner side of the diaphragm cup either does not change the resonance frequency of the diaphragm or changes it only insignificantly.

As already elucidated above, a metallic layer of this type is suitable in particular as a direct carrier for a lacquer coating, i.e., no additional layers are necessary as intermediate layers between the metallic layer and the lacquer coating.

To be able to connect the inner side of the diaphragm cup or the corresponding side of the diaphragm to a piezoelectric element, it is moreover preferably provided that an adhesive layer is applied directly area by area to the coating.

To improve the adhesive strength of the adhesive layer, it may be provided that the coating is surface treated, in particular plasma-treated, on the side facing the adhesive layer.

The present invention also includes a method for manufacturing a diaphragm cup described thus far for an ultrasonic transducer, it being provided according to the present invention that the coating takes place in a flow-through electroplating process. The flow-through process has the advantage that in particular the requirement that the diaphragm cup have an intact surface on the outer side of the diaphragm (since it represents a visible area on the vehicle) may be met, since in the case of the flow-through process, the risk of the surface of the diaphragm being damaged in the form of small indentations or scratches is minimized or eliminated.

Alternatively, a barrel plating process or another conventional electroplating process may be used.

In the case of an ultrasonic transducer including a diaphragm cup according to the present invention, it is moreover preferably provided that a piezoelectric element which is connected to the diaphragm with the aid of an adhesive layer is electrically connected to the metallic coating. In other words, this means that the diaphragm cup is designed as an electric component or implements an electrical functionality (in particular an electrical ground for improving the EMC protection).

It is preferably provided for the purpose of establishing the electrically conductive connection between the piezoelectric element and the diaphragm that the adhesive layer is designed as an electrically conductive adhesive layer.

BRIEF DESCRIPTION OF THE DRAWING

The FIGURE shows a longitudinal section through a diaphragm cup according to the present invention including a piezoelectric element situated in the diaphragm cup.

DETAILED DESCRIPTION

Diaphragm cup 10 according to the present invention for an ultrasonic transducer 100 may be used for any arbitrary application. In particular, the use in a motor vehicle is advantageous, since on the one hand, a high corrosion resistance with regard to impacts of weather and, for example, also with regard to de-icing salts must be provided in this case, while on the other hand, an acceptable appearance of diaphragm cup 10 is also required. The present invention is therefore elucidated in the following with the aid of a diaphragm cup 10 for the use in an ultrasonic distance system for a motor vehicle.

Diaphragm cup 10, which is preferably made of aluminum and is implemented as a deep-drawn part, has a blind-hole-shaped hollow area 11 which is delimited by a radially circumferential wall 12 as well as a diaphragm 13. The end of diaphragm cup 10 which is opposite to diaphragm 13 has a radially outward, flange-shaped edge 14 which is used to fasten or position diaphragm cup 10 at its installation point.

Diaphragm 13 has a significantly thinner design than wall 12 of diaphragm cup 10. Diaphragm 13 is used on the inner side of diaphragm cup 10, facing hollow area 11, to fasten or situate a piezoelectric element 15 which, in turn, is connected in a manner known per se via electrical lines (not illustrated) to an electronic evaluation unit or a circuit carrier which is also situated in hollow area 11 of diaphragm cup 10.

Since diaphragm 13, as already elucidated above, is significantly thinner than wall 12, the oscillations which are generated by piezoelectric element 15 are essentially transferred merely to diaphragm 13 and only to a small degree to wall 12. This is also to prevent a transmission of sound which might interfere with other ultrasonic transducers 100.

In general, the cross section of hollow area 11 may have any arbitrary shape, i.e., in particular, it does not have to be circular.

The material of diaphragm cup 10 is provided with a coating 20 made of nickel at least in the area of outer side 17 of diaphragm 13, preferably in the area of entire outer side 17 of diaphragm cup 10 as well as preferably at least in the area of the inner side of diaphragm 13 facing piezoelectric element 15. Coating 20 has a thickness between 0.25 μm and 0.60 μm and is applied to the material of diaphragm cup 10 in an electroplating process. Preferably, a flow-through process takes place, alternatively a usual standard process, for example in the form of a rack or barrel plating.

Layer 20 is used in the area of outer side 17 of diaphragm 13 as a carrier for a lacquer coating 21 which is applied directly to layer 20. Inner side 18 of diaphragm cup 10 is surface treated in the area of layer 20, at least in the area in which piezoelectric element 15 is situated, in particular through a plasma treatment. The surface treatment is used to improve the adhesive strength of an adhesive layer 22 which is used to fasten piezoelectric element 15 to inner side 18 of diaphragm 13, it being possible that, in the case that the (bottom) side of piezoelectric element 15 which faces diaphragm 13 is situated on an electrical ground just as diaphragm cup 10, adhesive layer 22 may be designed as an electrically conductive adhesive layer 22. This makes it possible to electrically conductively connect the bottom side of piezoelectric element 15 facing diaphragm 13 to diaphragm 13 via adhesive layer 22 without any additional electric lines or connections.

Diaphragm cup 10 described thus far may be changed or modified in various ways, without departing from the inventive idea.

What is claimed is:

1. A diaphragm cup for an ultrasonic transducer, comprising:
   a wall for carrying a diaphragm that is excitable to oscillations; and
   a single metallic coating which includes one of nickel and a nickel alloy at least in an area of the diaphragm on an outer side and an inner side of the diaphragm cup; and
   a lacquer coating applied to the outer side of the diaphragm cup directly on top of the single metallic coating without any intermediate layer, wherein the lacquer coating is not applied to any area on the inner side of the diaphragm cup,
   wherein the lacquer coating has a thickness between 0.25 μm and 0.60 μm.

2. The diaphragm cup as recited in claim 1, wherein the coating includes a nickel alloy that includes phosphorus.

3. The diaphragm cup as recited in claim 1, further comprising:
   an adhesive layer applied at least area by area to the inner side of the diaphragm cup directly on top of the single metallic coating.

4. The diaphragm cup as recited in claim 3, wherein the single metallic coating is surface treated on a side facing the adhesive layer.

5. The diaphragm cup as recited in claim 3, wherein the single metallic coating is plasma treated on a side facing the adhesive layer.

6. A method for manufacturing a diaphragm cup for an ultrasonic transducer, the diaphragm cup including a wall for carrying a diaphragm that is excitable to oscillations, and a single metallic coating which includes one of nickel and a nickel at least in an area of the diaphragm on an outer side and an inner side of the diaphragm cup, the method comprising:
   applying the metallic coating one of electrochemically and by chemical reaction from one of an aqueous electrolyte and a or solvent-based electrolyte,
   applying a lacquer coating to the outer side of the diaphragm cup directly on top of the single metallic coating without any intermediate layer, wherein the lacquer coating is not applied to any area on the inner side of the diaphragm cup,
   wherein the lacquer coating has a thickness between 0.25 μm and 0.60 μm.

7. The method as recited in claim 6, further comprising producing the single metallic coating in a flow-through electroplating process.

8. An ultrasonic transducer, comprising:
   a diaphragm cup that includes:
      a wall for carrying a diaphragm that is excitable to oscillations;
      a single metallic coating which includes one of nickel and a nickel at least in an area of the diaphragm on an outer side and an inner side of the diaphragm cup; and
      a lacquer coating applied to the outer side of the diaphragm cup directly on top of the single metallic coating without any intermediate layer, wherein the lacquer coating is not applied to any area on the inner side of the diaphragm cup,
   wherein the lacquer coating has a thickness between 0.25 μm and 0.60 μm; and
   a piezoelectric element connected to the diaphragm and electrically connected to the single metallic coating via an adhesive layer.

9. The ultrasonic transducer as recited in claim 8, wherein the adhesive layer is an electrically conductive adhesive layer.

10. The ultrasonic transducer as recited in claim 8, wherein the single metallic coating is an electrical ground.

* * * * *